(12) United States Patent
Christiansson et al.

(10) Patent No.: US 8,890,849 B2
(45) Date of Patent: Nov. 18, 2014

(54) IMAGE RECONSTRUCTION FOR TOUCH DETERMINATION

(71) Applicants: Tomas Christiansson, Prästvägen (SE); Nicklas Ohlsson, Strandgårdsgränd (SE)

(72) Inventors: Tomas Christiansson, Prästvägen (SE); Nicklas Ohlsson, Strandgårdsgränd (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 14/004,316

(22) PCT Filed: Sep. 24, 2012

(86) PCT No.: PCT/SE2012/051006
§ 371 (c)(1),
(2), (4) Date: Sep. 10, 2013

(87) PCT Pub. No.: WO2013/048312
PCT Pub. Date: Apr. 4, 2013

(65) Prior Publication Data
US 2014/0002400 A1 Jan. 2, 2014

Related U.S. Application Data

(60) Provisional application No. 61/539,608, filed on Sep. 27, 2011.

(30) Foreign Application Priority Data

Sep. 27, 2011 (SE) ...................................... 1150879

(51) Int. Cl.
*G06F 3/042* (2006.01)
*G06F 3/041* (2006.01)

(52) U.S. Cl.
CPC ...... *G06F 3/041* (2013.01); *G06F 2203/04109* (2013.01); *G06F 3/0421* (2013.01)
USPC ........................................................ 345/175

(58) Field of Classification Search
CPC .................... G06F 3/0421; G06F 2203/04109; G06F 3/0428; G06F 2203/04808
USPC ......................................................... 345/173
See application file for complete search history.

(56) References Cited

U.S. PATENT DOCUMENTS 6,972,753 B1 12/2005 Kimura et al.
7,432,893 B2 10/2008 Ma et al.
(Continued)

FOREIGN PATENT DOCUMENTS

EP 2343635 7/2011
WO WO 2009/048365 4/2009
(Continued)

OTHER PUBLICATIONS

Written Opinion issued in International Application No. PCT/SE2012/051006, dated Mar. 25, 2013.

(Continued)

*Primary Examiner* — Van Chow
(74) *Attorney, Agent, or Firm* — Harness, Dickey & Pierce, P.L.C.

(57) ABSTRACT

Touch sensitivity is enabled using a touch system that comprises a panel configured to conduct signals, e.g. by TIR, from a plurality of incoupling points to a plurality of outcoupling points, thereby defining detection lines across a touch surface between pairs of incoupling and outcoupling points. A signal processor operates in a repeating sequence of iterations to: calculate change values for the detection lines representative of signal changes between the current and a previous iteration, and operate a reconstruction algorithm on the change values to determine a differential interaction pattern across the touch surface. The signal processor also operates to update a tracking pattern as a function of the differential interaction pattern, and generate a current offset pattern based on the tracking pattern. The offset pattern is generated to represent current touch interaction on the touch surface and is supplied for identification of touches on the surface portion.

20 Claims, 6 Drawing Sheets

(56) References Cited

U.S. PATENT DOCUMENTS

| | | | |
|---|---|---|---|
| 8,350,827 B2 * | 1/2013 | Chung et al. | 345/175 |
| 8,727,581 B2 * | 5/2014 | Saccomanno | 362/336 |
| 2003/0210537 A1 * | 11/2003 | Engelmann | 362/26 |
| 2006/0114237 A1 | 6/2006 | Crockett et al. | |
| 2007/0075648 A1 | 4/2007 | Blythe et al. | |
| 2009/0153519 A1 | 6/2009 | Suarez et al. | |
| 2010/0309169 A1 | 12/2010 | Lieberman et al. | |

FOREIGN PATENT DOCUMENTS

| | | |
|---|---|---|
| WO | WO 2009/077962 | 6/2009 |
| WO | WO 2009/102681 | 8/2009 |
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/064983 | 6/2010 |
| WO | WO 2010/134865 | 11/2010 |
| WO | WO 2011/028169 | 3/2011 |
| WO | WO 2011/049511 | 4/2011 |
| WO | WO 2011/049512 | 4/2011 |
| WO | WO 2011/049513 | 4/2011 |
| WO | WO 2011/139213 | 11/2011 |
| WO | WO 2012/050510 | 4/2012 |

OTHER PUBLICATIONS

International Search Report issued in International Application No. PCT/SE2012/051006, dated Mar. 25, 2013.
International Search Report issued in European Application No. 12836505.3, dated Feb. 20, 2014.

* cited by examiner

IMAGE RECONSTRUCTION FOR TOUCH DETERMINATION

CROSS-REFERENCE TO RELATED APPLICATIONS

This application is the national phase under 35 U.S.C. §371 of PCT International Application No. PCT/SE2012/051006 which has an International filing date of Sep. 24, 2012, which claims priority to U.S. provisional patent application number 61/539,608 filed Sep. 27, 2011, and to Swedish patent application number SE 1150879-3 filed Sep. 27, 2011.

TECHNICAL FIELD

The present invention generally relates to touch sensing systems and data processing techniques in relation to such systems, and in particular to the use of image reconstruction for touch determination in such systems.

BACKGROUND ART

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

WO2011/028169 and WO2011/049512 disclose touch systems that are based on frustrated total internal reflection (FTIR). Light sheets are coupled into a panel to propagate inside the panel by total internal reflection (TR). When an object comes into contact with a touch surface of the panel, the propagating light will be attenuated at the point of touch. Arrays of light sensors are located around the perimeter of the touch surface to detect the received light for each light sheet. Measurement signals from the light sensors may be repeatedly processed for input into an image reconstruction algorithm that generates a two-dimensional distribution of attenuation values across the touch surface. This enables repeated determination of current position/size/shape of touches while one or more users interact with the touch surface.

In these types of FTIR-based touch systems, the touches need to be detected against a background of interferences, e.g. originating from fingerprints and other types of smear on the touch surface. The influence of interferences may vary not only over time but also across the touch surface, making it difficult to properly detect the touches on the touch surface at all times. Furthermore, the degree of interaction between a touching object and the touch surface may vary both over time and between different objects. For example, the interaction may depend on if an object is tapped, dragged or held in a fixed position onto the touch surface. Different objects may yield different degree of interaction, e.g. the degree of interaction may vary between fingers of a user, and even more so between the fingers of different users. It is also to be understood that a touching object may result in only a small attenuation of the propagating light, e.g. less than 1%. Certain systems may need to be designed to detect attenuations on the order of 0.1%-0.01%.

The above-mentioned WO2011/049512 proposes a technique of compensating for contaminations on the touch surface. In one embodiment, the received light energy at the light sensors is converted into attenuation values, e.g. by normalization with a reference value for each light sensor, whereupon the attenuation values are input into an image reconstruction algorithm that generates a current light status, which is a two-dimensional distribution of the attenuation values across the touch surface. The touch system also keeps track of a background status, which is a two-dimensional distribution of attenuation values caused by contaminations on the touch surface. Touches are then detected in a compensated light status which is generated by subtracting the background status from the current light status. To be able to detect a touch, represented as a small attenuation in the current light status, it may be necessary to implement the reconstruction algorithm so as to generate the current light status with a high bit resolution in attenuation values. However, this is demanding in terms of processing, and may lead to significant processing times. It is also conceivable that the available bit resolution for the reconstruction processing may be limited by hardware constraints.

The above-mentioned WO2011/028169 proposes an alternative compensation technique. The reference values for the light sensors, collectively denoted a background signal profile and used in the normalization and conversion of the measured energy values into attenuation values, are intermittently updated so as to include the influence of contaminations on the touch surface. The touch system repeatedly reads the energy values from the light sensors and uses current (updated) reference values to generate attenuation values, collectively denoted a current compensated signal profile. The current compensated signal profile may then be processed for touch determination, e.g. by means of an image reconstruction algorithm that generates a two-dimensional distribution of attenuation values across the touch surface, which may be further processed for touch determination. By tracking the influence of contaminations via the updating of the reference values, the touch system compensates for the contaminations already in the input to the reconstruction algorithm. Theoretically, by compensating on the input side, it is possible to operate the reconstruction algorithm with a reduced bit resolution while being able to detect small changes in attenuation in the reconstructed image. One challenge, however, is to achieve a sufficiently adequate compensation on the input side. If attenuation from contaminations remains in the reconstructed image, touch determination may be more or less hampered.

SUMMARY

It is an objective of the invention to at least partly overcome one or more limitations of the prior art.

In view of the foregoing, one objective is to enable a reduced bit resolution in the reconstruction processing in an FTIR-based touch system.

Another objective is to enable compensation for the influence of contaminations on the touch surface of the FTIR-system.

Yet another objective is to facilitate touch detection based on the image obtained by the reconstruction processing.

One or more of these and other objectives, which may appear from the description below, are at least partly achieved by means of a method of enabling touch determination, a computer program product, a device for enabling touch determination, and touch-sensitive apparatuses according to the independent claims, embodiments thereof being defined by the dependent claims.

A first aspect of the invention is a method of enabling touch determination based on an output signal from a touch-sensitive apparatus. The apparatus comprises a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal which represents a time-sequence of signal values for the detection lines. The method comprises the steps of, in each iteration of a sequence of iterations: obtaining, based on the output signal, a current signal value for each detection line; retrieving a current reference value for each detection line, the current reference value being representative of the current signal value obtained in a preceding iteration in the sequence of iterations; calculating a change value for each detection line as a function of the current signal value and the current reference value; operating a reconstruction algorithm on the change values to determine a differential interaction pattern on the surface portion; updating a tracking pattern as a function of the differential interaction pattern; generating a current accumulated touch interaction pattern as a function of a tracking pattern; and providing the current accumulated touch interaction pattern for identification of touches on the surface portion.

In the method of the first aspect, the differential interaction pattern is generated to represent a change in interaction on the surface portion since the preceding iteration in which the reference values were obtained for the detection lines. By proper selection of the preceding iteration in relation to the current iteration, it is possible to ensure that the maximum change in interaction on the surface portion matches the available bit resolution in the reconstruction processing so as to allow detection of touches with weak interaction with the propagating light. It is thus realized that the use of change values in the reconstruction processing may lower the demand on bit resolution in the reconstruction processing compared to the use of current signal values. Furthermore, a reduction in required bit resolution may lead to a reduction in processing time.

This is achieved without the need to precisely track and compensate for the influence of contaminations on the individual signal values before the signal values (or a formatted version thereof) are input to the reconstruction algorithm, even if such compensation might be done or attempted within the scope of the present invention. The inventive method involves a two-dimensional tracking, in which the tracking pattern is updated as function of the differential interaction pattern. The result of the two-dimensional tracking is used for producing, directly or after further processing, the current accumulated touch interaction pattern which is to be processed for touch determination. It should be realized that the method operates in a sequence of iterations, i.e. repeatedly, and that each iteration of the method may result in a differential interaction pattern which is used for updating the tracking pattern. Thus, as touches are locally added to and removed from the surface portion, corresponding interaction values will be changed at the corresponding locations in the tracking pattern and thereby affect the resulting accumulated touch interaction pattern. By operating on a tracking pattern, and using the tracking pattern for generating the accumulated touch interaction pattern, it is possible to track and compensate for the influence of contaminations downstream of the reconstruction processing, i.e. in relation to the reconstructed distribution of interaction values across the surface portion. The current accumulated touch interaction pattern may thus be generated to represent a current distribution of total interaction on the surface portion compensated at least partly for an influence of contaminations present on the surface portion.

The two-dimensional tracking may make it easy to detect all touches present on the surface portion. The current accumulated touch interaction pattern may be seen to represent a "snapshot" of the interaction across the surface portion at the current iteration. Thus, a touching object will show up in the accumulated touch interaction pattern, whether it is in motion across the surface portion or remains immobile on the surface portion.

As understood from the foregoing, the method of the first aspect operates in a sequence of iterations to reconstruct the differential interaction pattern and generate the current accumulated touch interaction pattern, such that the touch interaction on the surface portion may be assessed for every iteration, if desired.

The current reference values used in the first aspect may be equal to the current signal values obtained in the preceding iteration. Alternatively, and especially if the reconstruction algorithm requires the change values to be provided in a dedicated format, the current reference values may be a formatted version of the current signal values obtained in the preceding iteration.

It should be noted that the step of generating "a signal value for each detection line" is to be interpreted as relating to the detection lines deemed relevant or useful for reconstructing the differential interaction pattern (and for generating the accumulated touch interaction pattern). Thus, the touch-sensitive apparatus may actually define further detection lines, which are not used in the reconstruction during one or more, or all, iterations of the method.

In one embodiment, the step of generating the current tracking pattern comprises adding the differential interaction pattern to the tracking pattern generated in the preceding iteration.

Each of the above-mentioned "interaction patterns" comprises a two-dimensional distribution of "interaction values" that represent the local interaction with the propagating light across the surface portion. The interaction values may be given in different formats, but typically represent local attenuation or local transmission in a broad sense. The signal values may represent received signal energy or power, and the change values may be generated to represent measured energy, differential energy (e.g. given by a measured energy value subtracted by a reference energy value for each detection line), relative attenuation (e.g. given by a measured energy value divided by a reference energy value for each detection line), relative transmission (e.g. corresponding to 1—relative attenuation), a logarithmic attenuation (e.g. corresponding to the logarithm of the relative attenuation), etc.

In one embodiment, the change values are calculated to represent the relative change between the current signal value and the preceding signal value for the respective detection line. In one implementation, the change values are calculated to represent a logarithm of the relative change for the respective detection line. Thereby, the differential interaction pattern, the tracking pattern and the accumulated touch interaction pattern may be generated to comprise distributions of attenuation or transmission values across the surface portion. This embodiment may also reduce or eliminate the need to obtain reference values for normalization of the signal values as taught by the prior art.

In one embodiment, the reconstruction algorithm comprises an image reconstruction algorithm, such as a tomographic algorithm.

The tracking pattern that is updated across the iterations of the method may be implemented in different ways.

In a first tracking embodiment, the tracking pattern represents a distribution of total interaction on the surface portion, i.e. including the influence of accumulated contaminations. In such an embodiment, the current accumulated touch interaction pattern may be generated as a function of the updated tracking pattern. The step of generating the current accumulated touch interaction pattern may further comprise: retrieving a background pattern which at least partly represents a distribution of interaction caused by contaminations present on the surface portion, and compensating the updated tracking pattern as a function of the background pattern. This enables compensation for the influence of contaminations downstream of the reconstruction processing and may provide a simple way of operating on two-dimensional distributions. For example, the step of compensating may comprise subtracting the background pattern from the updated tracking pattern. In one embodiment, the method further comprises: updating the background pattern as a function of the touches identified on the surface portion in the current iteration. Thereby, the background pattern may be continuously or intermittently updated across the iterations of the method. Such a step of updating the background pattern may comprise: estimating an influence of added contaminations to the surface portion and including the estimated influence in the background pattern. For example, the background pattern may be updated in accordance with the teachings of aforesaid WO2011/049512.

In a second tracking embodiment, the tracking pattern is updated to represent the current accumulated touch interaction pattern. The second tracking embodiment may provide an increased robustness to slow variations in the structure of the touch-sensing apparatus, e.g. due to vibrations, temperature drifts, etc. In the above-described first tracking embodiment, the generation of the current accumulated touch interaction pattern involves subtracting a background pattern from the tracking pattern, which represents the total interaction on the surface portion. After some time of use, significant contaminations (fingerprints, smear, etc) may have been deposited on the surface portion, resulting in large interaction values in both the tracking pattern and the background pattern. It is realized that small errors in either of the large numbers may result in significant errors in the calculated difference, which may be a small number. This sensitivity may be avoided or ameliorated in the second tracking embodiment, since the tracking pattern is generated to represent the accumulated touch interaction pattern which may be (wholly or partly) compensated for the influence of contaminations. Thereby, the tracking pattern may comprise smaller numbers, resulting in an improved stability and robustness of the tracking. A further improvement may be achieved by generating the interaction values such that zero values represent absence of touch interaction on the surface portion.

The second tracking embodiment may also enable an improved memory and processing efficiency compared to the first tracking embodiment, since it is possible to omit the background pattern, and thereby the need to repeatedly access an electronic memory for storage and retrieval of the background pattern.

The second tracking embodiment may be seen to generate the current accumulated touch interaction pattern as a function of the differential interaction pattern and the tracking pattern updated in the preceding iteration, and to update the tracking pattern to represent the current accumulated touch interaction pattern.

In one embodiment of the second tracking embodiment, the step of updating the tracking pattern comprises updating the current accumulated touch interaction pattern as a function of touches identified on the surface portion in the current iteration. The updating enables compensation for the influence of contaminations downstream of the reconstruction processing and may provide a simple way of operating on two-dimensional distributions. For example, the step of updating the tracking pattern may comprise estimating an influence of added contaminations to the surface portion and removing the estimated influence from the current accumulated touch interaction pattern. Thereby, the accumulated touch interaction pattern is compensated for the influence of contaminations across the iterations of the method. For example, the accumulated touch interaction pattern may be updated in analogy with the updating of the background pattern as described in aforesaid WO2011/049512.

In one embodiment of the second tracking embodiment, the current accumulated touch interaction pattern is generated as a sum of the differential interaction pattern and the tracking pattern updated in the preceding iteration. It is to be understood that such a sum may be obtained in the step of updating the tracking pattern and may be re-used to generate the current accumulated touch interaction pattern, or vice versa.

As noted above, the "preceding iteration" may be selected in view of the available bit resolution in the reconstruction processing and in view of the weakest interactions to be detected. In one embodiment, the preceding iteration is selected to precede the current iteration by a fixed number of iterations. In another embodiment, the preceding iteration is selected to precede the current iteration by a given time period, which may be less than 2 seconds, preferably less than 1 second, and most preferably less than 0.5 seconds. In a specific implementation, the preceding iteration is the immediately preceding the current iteration in the sequence of iterations. In an alternative implementation, the preceding signal value is repeatedly set to the current signal value after a predetermined plurality of iterations in the sequence of iterations.

In a specific implementation, the method of the first aspect operates on the output signal of a touch-sensitive apparatus in which the at least one signal generator is arranged to provide light inside the panel, such that the light propagates from the incoupling points to the outcoupling points by internal reflections between a touch surface and an opposite surface of the panel, the touch-sensitive apparatus being configured such that the propagating light is locally attenuated by one or more objects touching the touch surface. Specifically, the propagating light may be attenuated by frustration of total internal reflection of light in the touch surface.

A second aspect of the invention is a computer program product comprising computer code which, when executed on a data-processing system, is adapted to carry out the method of the first aspect.

A third aspect of the invention is a device for enabling touch determination based on an output signal from a touch-sensitive apparatus. The apparatus comprises a panel configured to conduct signals from a plurality of incoupling points to a plurality of outcoupling points, thereby defining detection lines that extend across a surface portion of the panel between pairs of incoupling and outcoupling points, signal generating means coupled to the incoupling points to generate the signals, and signal detecting means coupled to the outcoupling points to generate the output signal which represents a time-sequence of signal values for the detection lines. The device comprises: an input for receiving the output signal, and a signal processor configured to, repeatedly in a sequence of iterations: obtain, based on the output signal, a current signal value for each detection line; retrieve a current reference value for each detection line, the current reference value being representative of the current signal value obtained in a preceding iteration in the sequence of iterations; calculate a change value for each detection line as a function of the current signal value and the current reference value; operate a reconstruction algorithm on the change values to determine a differential interaction pattern on the surface portion; update a tracking pattern as a function of the differential interaction pattern; generate a current accumulated touch interaction pattern as a function of the tracking pattern; and provide the current accumulated touch interaction pattern for identification of touches on the surface portion.

A fourth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; means for generating the signals at the incoupling points; means for generating an output signal based on detected signals at the outcoupling points; and the device of the third aspect.

A fifth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; means for generating the signals at the incoupling points; means for generating an output signal based on detected signals at the outcoupling points; and the device for enabling touch determination according to the third aspect.

A sixth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; at least one signal generator coupled to the incoupling points to generate the signals; at least one signal detector coupled to the outcoupling points to generate an output signal which represents a time-sequence of signal values for the detection lines; and a signal processor connected to receive the output signal and configured to, repeatedly in a sequence of iterations: obtain, based on the output signal, a current signal value for each detection line; retrieve a current reference value for each detection line, the current reference value being representative of the current signal value obtained in a preceding iteration in the sequence of iterations; calculate a change value for each detection line as a function of the current signal value and the current reference value; operate a reconstruction algorithm on the change values to determine a differential interaction pattern on the surface portion; update a tracking pattern as a function of the differential interaction pattern; generate a current accumulated touch interaction pattern as a function of the tracking pattern; and provide the current accumulated touch interaction pattern for identification of touches on the surface portion.

Any one of the embodiments of the first aspect can be combined with the second to sixth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
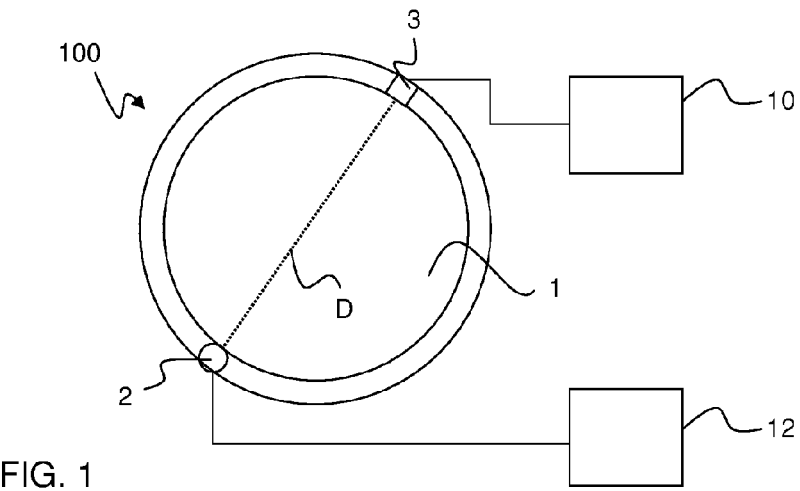
FIG. 1 is a plan view of a touch-sensitive apparatus.

The present invention relates to techniques for enabling extraction of touch data for objects in contact with a touch surface of a touch-sensitive apparatus. The description starts out by presenting the underlying concept of such a touch-sensitive apparatus, especially an apparatus operating by frustrated total internal reflection (FTIR) of light. The description continues to present embodiments for improving the signal processing before touch determination. Finally, detailed examples are given.

Throughout the description, the same reference numerals are used to identify corresponding elements.

1. Touch-Sensitive Apparatus

FIG. 1 illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors, which are distributed along the periphery of the touch surface 1. Each pair of an emitter and a sensor defines a detection line, which corresponds to the propagation path for an emitted signal from the emitter to the sensor. In FIG. 1, only one such detection line D is illustrated to extend from emitter 2 to sensor 3, although it should be understood that the arrangement typically defines a dense grid of intersecting detection lines, each corresponding to a signal being emitted by an emitter and detected by a sensor. Any object that touches the touch surface along the extent of the detection line D will thus decrease its energy, as measured by the sensor 3. Thus, a touch on the touch surface 1 by an object results in an attenuation of one or more detection lines.

The arrangement of sensors 3 is electrically connected to a signal processor 10, which samples and processes an output signal from the arrangement. The output signal is indicative of the received signal energy or signal power at each sensor 3. As will be explained below, the signal processor 10 may be configured to process the output signal so as to recreate a distribution of interaction values (for simplicity, referred to as an "interaction pattern" or "attenuation field" in the following) across the touch surface 1. The interaction pattern may be represented in many different ways, e.g. as interaction values arranged in a regular x-y-grid, such as in an ordinary digital image, although other types of grids are conceivable, e.g. hexagonal patterns or triangular meshes. The interaction pattern may be further processed by the signal processor 10 or by a separate device (not shown) for touch determination, which may involve extraction of touch data, such as a position (e.g. x, y coordinates), a shape or an area of each touching object.

In the example of FIG. 1, the touch-sensitive apparatus 100 also includes a controller 12 which is connected to selectively control the activation of the emitters 2 and, possibly, the readout of data from the detectors 3. The signal processor 10 and the controller 12 may be configured as separate units, or they may be incorporated in a single unit. One or both of the signal processor 10 and the controller 12 may be at least partially implemented by software executed by a processing unit 14.

Generally, the touch-sensitive apparatus 100 (the touch surface 1) may be of any shape, such as circular, elliptical or polygonal, including rectangular. The touch-sensitive apparatus 100 may be designed to be overlaid on or integrated in a display device or monitor.

The touch-sensitive apparatus 100 may be configured to permit transmission of energy in one of many different forms. The emitted signals may thus be any radiation or wave energy that can travel in and across the touch surface 1 including, without limitation, light waves in the visible or infrared or ultraviolet spectral regions, electrical energy, electromagnetic or magnetic energy, or sonic and ultrasonic energy or vibration energy.

Figure 2A:
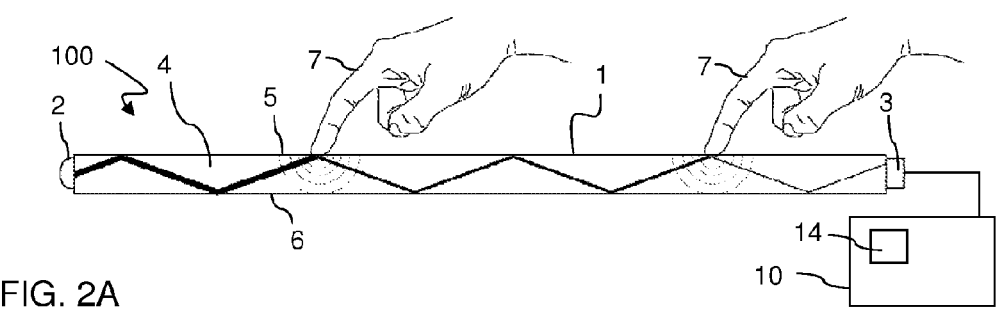
FIGS. 2A-2B are side and top plan views of touch-sensitive systems operating by frustrated total internal reflection (FTIR).

In the following, an example embodiment based on propagation of light will be described. FIG. 2A is a side view of a touch-sensitive apparatus 100 which includes a light transmissive panel 4, one or more light emitters 2 (one shown) and one or more light sensors 3 (one shown). The panel 4 is made of solid material in one or more layers and defines two opposite and generally parallel surfaces 5, 6 and may be planar or curved. The panel 4 defines an internal radiation propagation channel, in which light propagates by internal reflections. In the example of FIG. 2A, the propagation channel is defined between the boundary surfaces 5, 6 of the panel 4, where the top surface 5 allows the propagating light to interact with touching objects 7 and thereby defines the touch surface 1. This is achieved by injecting the light into the panel 1 such that the light from the emitter(s) 2 is reflected by total internal reflection (TIR) in the touch surface 1 as it propagates through the panel 4. The light may be reflected by TIR in the bottom surface 6 or against a reflective coating thereon. It is also conceivable that the propagation channel is spaced from the bottom surface 6, e.g. if the panel comprises multiple layers of different materials. The sensors 3 are arranged at the periphery of the panel 4 to generate a respective measurement signal which is indicative of the energy of received light.

As shown in FIG. 2A, the light may be coupled into and out of the panel 4 directly via the edge portion that connects the top and bottom surfaces 5, 6 of the panel 4. Alternatively, not shown, a separate coupling element (e.g. in the shape of a wedge) may be attached to the edge portion or to the top or bottom surface 5, 6 of the panel 4 to couple the light into and/or out of the panel 4. When the object 7 is brought sufficiently close to the boundary surface, part of the light may be scattered by the object 7, part of the light may be absorbed by the object 7, and part of the light may continue to propagate in the panel 4 in its original direction across the panel 4. Thus, when the object 7 touches a boundary surface of the panel (e.g. the top surface 5), the total internal reflection is frustrated and the energy of the transmitted light is decreased. This type of touch-sensitive apparatus is denoted an "FTIR system" (FTIR—Frustrated Total Internal Reflection) in the following.

Figure 2B:
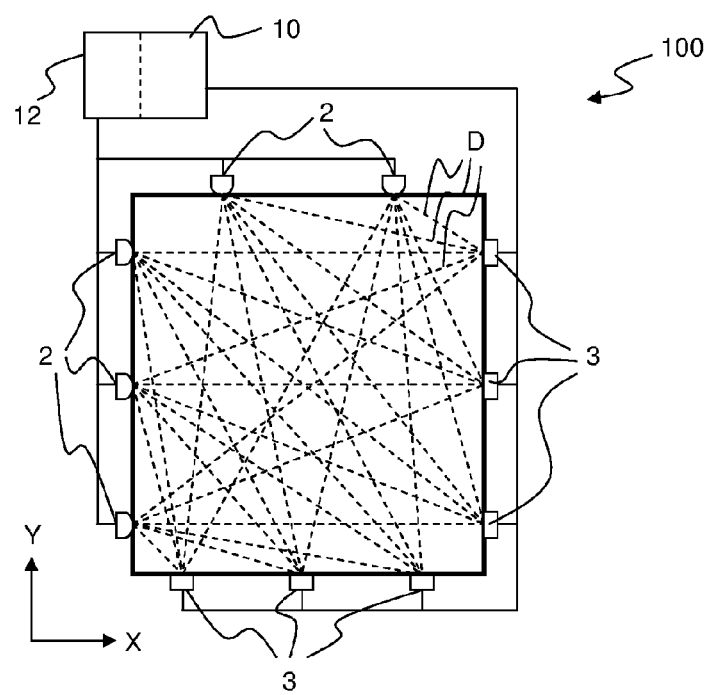

The FTIR system 100 may be operated to measure the energy of the light transmitted through the panel 4 on a plurality of detection lines. This may, e.g., be done by activating a set of spaced-apart emitters 2 to generate a corresponding number of light sheets inside the panel 4, and by operating a set of sensors 3 to measure the transmitted energy of each light sheet. Such an embodiment is illustrated in FIG. 2B, where each emitter 2 generates a beam of light that expands in the plane of the panel 4 while propagating away from the emitter 2. Each beam propagates from one or more entry or incoupling points within an incoupling site on the panel 4. Arrays of light sensors 3 are located around the perimeter of the panel 4 to receive the light from the emitters 2 at a number of spaced-apart outcoupling points within an outcoupling site on the panel 4. It should be understood that the incoupling and outcoupling points merely refer to the position where the beam enters and leaves, respectively, the panel 4. Thus, one emitter/sensor may be optically coupled to a number of incoupling/outcoupling points. In the example of FIG. 2B, however, the detection lines D are defined by individual emitter-sensor pairs. This implementation and further variants are disclosed in more detailed in Applicant's WO2010/064983, which is incorporated herein in its entirety by this reference.

It is to be understood that FIG. 2 merely illustrates one example of an FTIR system. For example, the detection lines may instead be generated by sweeping or scanning one or more beams of light inside the panel. Such and other examples of FTIR systems are e.g. disclosed in U.S. Pat. Nos. 6,972,753, 7,432,893, US2006/0114237, US2007/0075648, WO2009/048365, WO2010/006882, WO2010/006883, WO2010/006884, WO2010/006885, WO2010/006886, and WO2010/134865, which are all incorporated herein by this reference. The inventive concept may be advantageously applied to such alternative FTIR systems as well.

Irrespective of implementation, the light sensors 3 collectively provide an output signal, which is received and sampled by the signal processor 10. The output signal contains a number of sub-signals, also denoted "projection signals", each representing the energy of light emitted by a certain light emitter 2 and received by a certain light sensor 3, i.e. the received energy (or equivalently, power or intensity) on a certain detection line. Depending on implementation, the signal processor 10 may need to process the output signal for separation of the individual projection signals.

2. Reconstruction Algorithms and Input Format

As noted above, a reconstruction algorithm may be used for determining an interaction pattern across the touch surface 1, based on the projection signals in the output signal. Embodiments of the invention may use any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction algorithm may generate the interaction pattern by adapting one or more basis functions to the reconstruction values and/or by statistical methods such as Bayesian inversion. Examples of such reconstruction algorithms designed for use in touch determination are found in WO2010/006883, WO2009/077962, WO2011/049511, WO2011/139213, and WO2012/050510, all of which are incorporated herein by reference. Conventional reconstruction methods are found in the mathematical literature, e.g. "The Mathematics of Computerized Tomography" by Natterer, and "Principles of Computerized Tomographic Imaging" by Kak and Slaney.

The interaction pattern may be reconstructed within one or more subareas of the touch surface. The subareas may be identified by analyzing intersections of detection lines across the touch surface, based on the above-mentioned projection signals. Such a technique for identifying subareas is further disclosed in WO2011/049513, which is incorporated herein by this reference.

The reconstruction algorithm is designed based on the assumption that the input values, s, depend on the interaction pattern, a, according to a projection function $\mathcal{P}$, which reflects the properties of the physical touch system: $s=\mathcal{P}(a)$. The reconstruction algorithm is thus designed to reconstruct a from s by use of a reconstruction function $\mathcal{P}'$: $a=\mathcal{P}'(s)$.

It is to be understood that the format of the input values s may be specific to the reconstruction function $\mathcal{P}'$. The following examples assume that the reconstruction function $\mathcal{P}'$ is designed to reconstruct an attenuation field, i.e. each interaction value ("attenuation value") in the reconstructed interaction pattern a represents a local attenuation of energy by an attenuating medium. In such an implementation, the input values s may be represented as attenuation values for individual detection lines.

This choice of input values will now be further explained with reference to FIG. 2A, which indicates that the propagating light will not be blocked by the touching object 7. Thus, if two objects 7 happen to be placed after each other along a light path from an emitter 2 to a sensor 3, both objects 7 will interact with the propagating light. Provided that the light energy is sufficient, a remainder of the light will reach the sensor 3 and generate a projection signal that allows both interactions (touches) to be identified. Thus, in multi-touch FTIR systems, the transmitted light may carry information about a plurality of touches.

The transmission $T_k$ for the k:th detection line $D_k$ may be obtained from the definition of attenuation through an attenuating medium:

$$I_k = I_{0,k} \cdot (e^{-\int a(x)dx}) \rightarrow T_k = I_k/I_{0,k} = e^{-\int a(x)dx}$$

In this formulation, $I_k$ is a signal value representing the transmitted energy on detection line $D_k$ with attenuating object(s), $I_{0,k}$ is a signal value representing the transmitted energy on detection line $D_k$ without attenuating objects, and $a(x)$ is the attenuation coefficient along the detection line $D_k$. In this formulation, the detection line is assumed to interact with the touch surface along the entire extent of the detection line, i.e. the detection line is represented as a mathematical line.

It is thus realized that a reconstruction function $\mathcal{P}'$ may be designed to operate on transmission data for the detection lines. Such transmission data may be obtained by dividing the projection values by a respective background or reference value ($REF_k$). By proper choice of reference values, the projection values are thereby converted into transmission values, which thus represent the fraction (normally in the range [0, 1]) of the available light energy that has been measured on each of the detection lines.

Certain tomographic reconstruction techniques, such as Filtered Back Projection (FBP) are based on the theory of the Radon transform which deals with line integrals. Such reconstruction techniques may therefore be designed to operate on formatted signal values $s_k$ given by the negative logarithm of the transmission:

$$s_k = -\log(I_k/REF_k) = -\log(e^{-\int a(x)dx}) = \int a(x)dx$$

It can be noted that the formatted signal values $s_k$ in fact is a measure of the total attenuation for the respective detection lines $D_k$. In a variant, the positive logarithm is used.

In a variant, the formatted signal values $s_k$ may be given by any known approximation to the above expression. A simple approximation of $-\log(T_k)$, which is a good approximation when $T_k$ is close to 1 and may be useful also for smaller values of $T_k$, is given by $s_k = 1 - T_k$.

3. Suppressing Interferences in the Interaction Pattern

In its various aspects, the invention relates to a touch determination technique that is able to detect touches on the touch surface, even in the presence of time-varying interferences, e.g. caused by contaminations or deposits on the touch surface 1. The suppression of interferences is achieved in a processing method that operates in a sequence of iterations. In each iteration, a reconstruction algorithm is operated on current signal values sampled from the projection signals to determine an interaction pattern, which indicates the two-dimensional distribution of touches on the touch surface 1. The suppression is achieved by operating a reconstruction algorithm on change values, which are calculated for each detection line based on its current signal value and a preceding signal value, and using a resulting differential interaction pattern to update a tracking pattern generated in a preceding iteration. The tracking pattern may then be used as, or be processed so as to generate, an accumulated touch interaction pattern in which the influence of interferences is suppressed.

As will be realized from the following description, by updating a tracking pattern based on the differential interference pattern it is possible to track and compensate for the influence of contaminations in a simple and processing-efficient way without requiring excessive bit resolution. Below, embodiments using different types of tracking pattern will be described with reference to the flow charts in FIG. 3 and FIG. 4.

In the following description, reference may be made to a "pixel" with a corresponding "pixel value" in a pattern. As used herein, a pixel is intended to encompass all types of cells, basis functions and areas defined in the pattern and associated with an interaction value.

Further, the following examples are given for an interaction pattern that represents local attenuation and is denoted "attenuation pattern".

Figure 3:
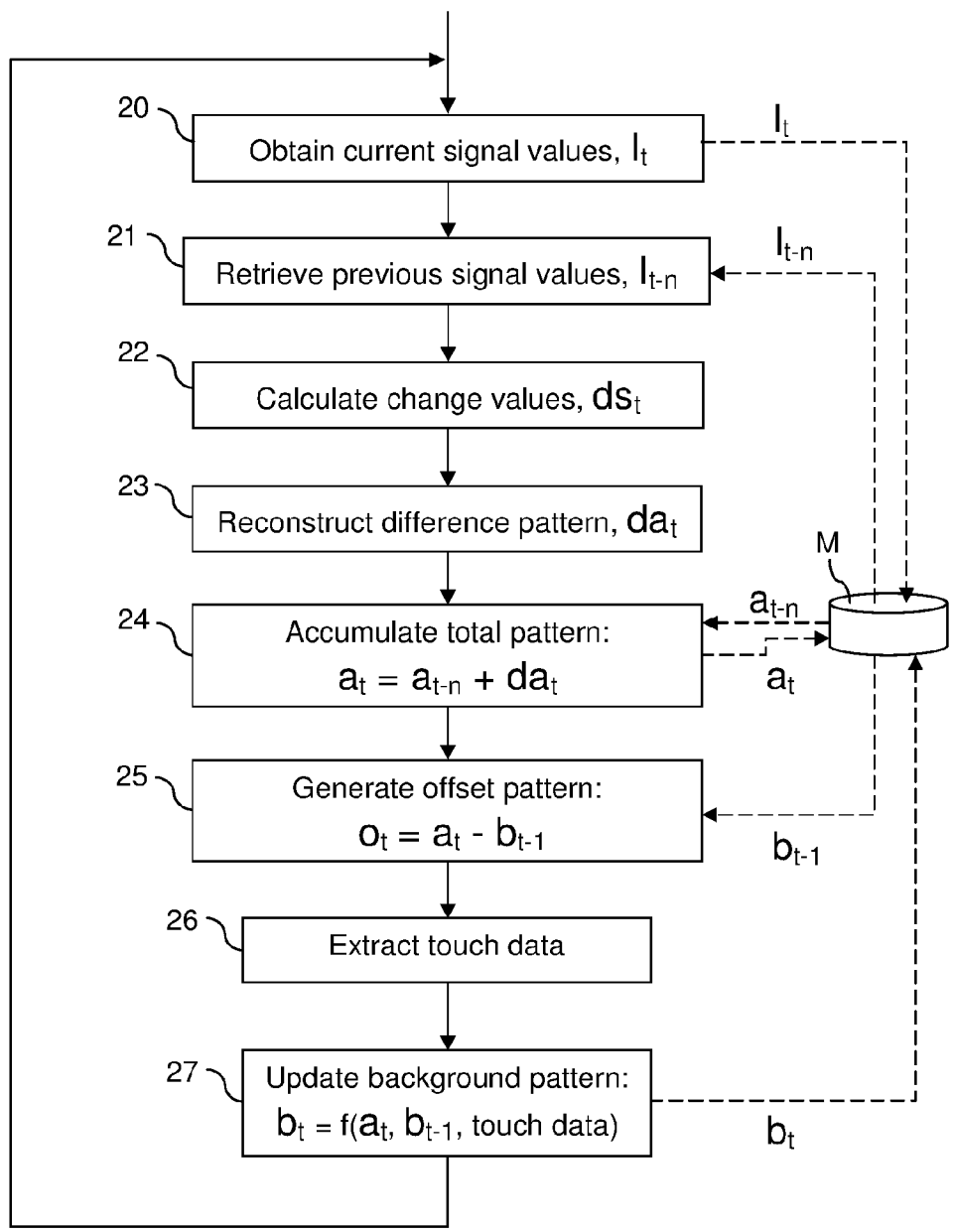
FIG. 3 is a flow chart of a touch determination method according to a first embodiment.

FIG. 3 shows a first embodiment of a method for reconstruction and touch data extraction in a touch-sensitive apparatus, such as the above-described FTIR system. The method involves a sequence of steps 20-27 that are repeatedly executed, typically by the signal processor 10 (FIGS. 1-2). In the context of this description, each sequence of steps 20-27 is denoted an iteration or a sensing instance.

Each iteration starts by a data collection step 20, in which measurement values are sampled from the light sensors 3 in the FTIR system, typically by sampling a value from each of the aforesaid projection signals. The data collection step 20 results in one projection value for each detection line. It may be noted that the data may, but need not, be collected for all available detection lines in the FTIR system. The data collection step 20 may also include pre-processing of the measurement values, e.g. filtering for noise reduction. For the purpose of the following discussion, the current projection value is generally denoted $I_t$, although it is realized that there is one such value for each of k detection lines. Step 20 also involves storing the current projection value $I_t$ (or its logarithm, see below) in an electronic memory M for retrieval in a subsequent iteration. The memory M (FIG. 5) is located in or accessible to the signal processor 10.

In step 21, a previous projection value $I_{t-n}$ (or its logarithm, see below) for each detection line is retrieved from memory M. The previous projection values $I_{t-n}$ were sampled from the projection signals during a preceding iteration. In the following example, it is assumed that the previous projection values are sampled in the immediately preceding iteration (i.e. n=1). Other variants are conceivable, as will be described later on.

Then, a change value $ds_t$ is calculated for each detection line, using the current projection values $I_t$ and the previous projection values $I_{t-n}$ (step 22), and a reconstruction function $\mathcal{P}'$ is operated on the resulting ensemble of change values $ds_t$ to generate a two-dimensional distribution $da_t$ of difference values, denoted a "difference pattern" or a "differential interaction pattern" (step 23). The difference pattern is a distribution of difference values across the touch surface (or a relevant part of the touch surface), where each difference value may represent a local change (increase/decrease) in attenuation between the current and the previous iteration in a specific position or pixel on the touch surface. The difference pattern $da_t$ may thus be seen as an image of the change in touch interaction and in contamination contribution between these iterations across the touch surface 1.

The reconstruction step 23 may use any suitable projection function $\mathcal{P}'$. Most reconstruction functions $\mathcal{P}'$ are at least approximately linear, i.e. $\mathcal{P}'(a \cdot x + b \cdot y) = a \cdot \mathcal{P}'(x) + b \cdot \mathcal{P}'(y)$. Thereby, the difference pattern may be generated by operating the reconstruction function $\mathcal{P}'$ on a difference between formatted signal values:

$$da_t = a_t - a_{t-n} = \mathcal{P}'(s_t) - \mathcal{P}'(s_{t-n}) = \mathcal{P}'(s_t - s_{t-n}) = \mathcal{P}'(ds_t)$$

where $a_t$ and $a_{t-n}$ is the total attenuation pattern at the current and previous iteration, respectively. Thus, the difference pattern may be generated as a function of change values representing the difference in formatted signal values. Using the above definition of the formatted signal values, it can be shown that:

$$ds_t = s_t - s_{t-n} = \log\left(\frac{I_{t-n}}{REF}\right) - \log\left(\frac{I_t}{REF}\right) = -\log\left(\frac{I_t}{REF} \bigg/ \frac{I_{t-n}}{REF}\right) = -\log(I_t/I_{t-n})$$

Thus, the change value $ds_t$ represents the relative change in the projection value for a detection line between the previous and the current iteration. Thereby, it is realized that the change value may be calculated as a difference in logarithmic signal values for a detection line:

$$ds_t = -\log(I_t/I_{t-n}) = \log(I_{t-n}) - \log(I_t)$$

As seen, the difference pattern $da_t$ may be reconstructed without the need to convert the projection values into formatted signal values, such as transmission values, e.g. by dividing the projection values by a dedicated reference value REF. This may improve processing speed. However, in certain embodiments, it is conceivable that the change value $ds_t$ is calculated using formatted signal values.

Further, by operating on change values to reconstruct a difference pattern, it is possible to make even very small changes in interaction detectable in the reconstructed distribution. In contrast, consider a prior art touch system that operates on the current formatted signal values to reconstruct a total attenuation pattern: $a_t = \mathcal{P}'(s_t)$. As the system is run for some time, contaminations will accumulate on the touch surface, causing the projection values $I_t$ to diverge significantly from the reference values REF. It is realized that the reconstruction function may need to be implemented with a significant bit resolution in order for weak interactions to be detectable in the total attenuation pattern $a_t$. This limitation is overcome by operating on change values $ds_t$.

Reverting to step 21 in FIG. 3, it is to be understood that the data retrieved from memory M may be a previous projection value $I_{t-n}$, which is processed in step 21 for conversion to a logarithmic value: $\log(I_{t-n})$. However, it may be more processing efficient for step 20 to calculate and store the logarithm of the current projection value, $\log(I_t)$, so that it can be retrieved and directly used in step 21 of a subsequent iteration.

In a tracking step 24, a tracking pattern $a_{t-n}$ is retrieved from memory M. The tracking pattern was updated in the previous iteration, and is now again updated by adding the difference pattern $da_t$ to the previous tracking pattern $a_{t-n}$, pixel by pixel:

$$a_t = da_t + a_{t-n}$$

This results in a current tracking pattern $a_t$, which is stored in memory M. The tracking pattern corresponds to the attenuation pattern that would have been obtained by the conventional approach of operating the reconstruction function on current formatted signal values: $a_t = \mathcal{P}'(s_t)$. In other words, the tracking pattern corresponds to a total attenuation pattern, but this pattern is generated by repeatedly, iteration by iteration, accumulating the difference pattern to a starting pattern $a_0$:

$$a_t = da_t + \Sigma_0^{t-1} a_\tau.$$

The starting pattern $a_0$ may e.g. be set to represent total absence of interaction across the touch surface, e.g. zero attenuation. It is conceivable to use other functions for combining the tracking pattern $a_{t-n}$ and difference pattern $da_t$, e.g. a weighted sum.

In a compensation step 25, the current (updated) tracking pattern $a_t$ is compensated for the influence of contaminations on the touch surface, so as to generate an accumulated touch interaction pattern or "offset pattern" $o_t$. The compensation is achieved by continuously tracking the contribution of contaminations on the touch surface. To this end, in step 25 a two-dimensional background pattern $b_{t-1}$ is retrieved from memory M and subtracted from the current tracking pattern $a_t$, pixel by pixel:

$$o_t = a_t - b_{t-1}$$

The background pattern $b_{t-1}$ may be determined in the immediately preceding iteration. It is conceivable to apply different weights to the background pattern and the current tracking pattern $a_t$ when calculating the current offset pattern $o_t$.

In a subsequent extraction step 26, the offset pattern is processed for identification of touch-related features and extraction of touch data. Any known technique may be used for isolating touches within the offset pattern. For example, ordinary blob detection and tracking techniques may be used for finding the touches. In one embodiment, a threshold is first applied to the offset pattern, to remove noise. Any areas with interaction values that fall below or above (depending on implementation) the threshold may be further processed to find the center and shape by fitting for instance a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, standard blob detection, water shedding techniques, flood fill techniques etc. The extraction step 26 may be concluded by outputting the extracted touch data.

A background estimation step 27 estimates the current signal contribution from contaminations on the touch surface. Typically, contaminations may include smear from fingers, dust, liquids, etc. The background estimation step results in an updated background pattern $b_t$ (or "interference pattern"), which is an estimate of the distribution of interaction caused by these contaminations and, possibly, unwanted signal components of other origin. The updated background pattern $b_t$ is stored on memory M for retrieval by step 25 in one or more subsequent iterations.

In step 27, the current background pattern $b_t$ may be estimated pixel-by-pixel on basis of values of spatially corresponding pixels of the previous background pattern $b_{t-1}$ in combination with the current total interaction pattern $a_t$ (from step 24) and/or the current offset pattern $o_t$ (from step 25) and/or information about touch interactions (from step 26). It is also possible that the estimation takes into account corresponding data from one or more preceding iterations. Often, pixels of the background pattern that are deemed to correspond to a touch are updated differently from pixels that are deemed not to correspond to any touch. The background pattern may also be updated on a section-by-section basis, where each section comprises a number of pixels. The estimation step 27 may be implemented according to any of the techniques for updating the "background status" as disclosed in aforesaid WO2011/049512, which is incorporated herein in its entirety by this reference. As an alternative or supplement to these techniques, it is conceivable to generate the current background pattern according to an "exponential forget" algorithm:

$$b_t = b_{t-1} + \varepsilon \cdot (a_t - b_{t-1}) \quad \begin{cases} \varepsilon = 0, \text{ if touch} \\ \varepsilon = 0.1, \text{ if no touch} \end{cases}$$

This update algorithm will cause the background pattern to gradually approach the total attenuation pattern in regions without touch interaction. Thereby, whenever a touch disappears from the touch surface, there will be a local and gradual updating of the background pattern towards the corresponding attenuation values of the total attenuation pattern. This is a simple algorithmic way of updating the background pattern. It is realized that $\varepsilon = 0.1$ is only given as an example value.

After step 27, the process returns to the data collection step 20.

It is to be understood that one or more of steps 20-27 may be effected concurrently. For example, the data collection step 20 of a subsequent sensing instance may be initiated concurrently with any one of steps 21-27.

Figure 6A:
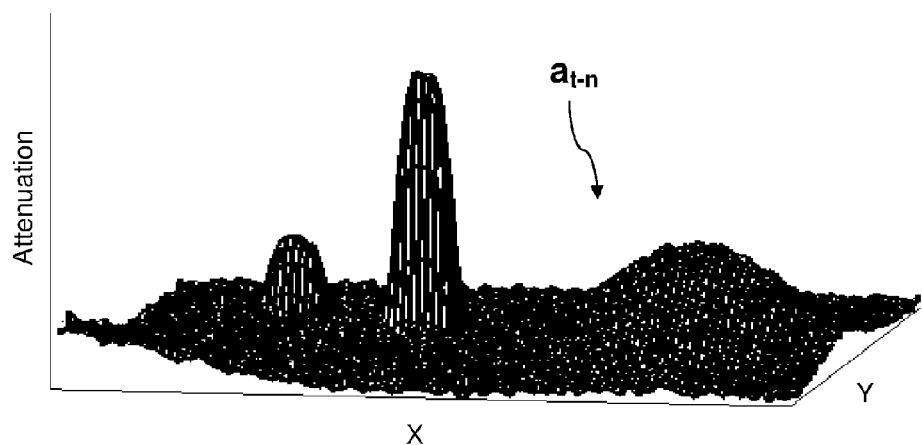
FIGS. 6A-6E illustrate a preceding total attenuation pattern, a difference pattern, a current total attenuation pattern, a background pattern, and an offset pattern, respectively.
Figure 6B:
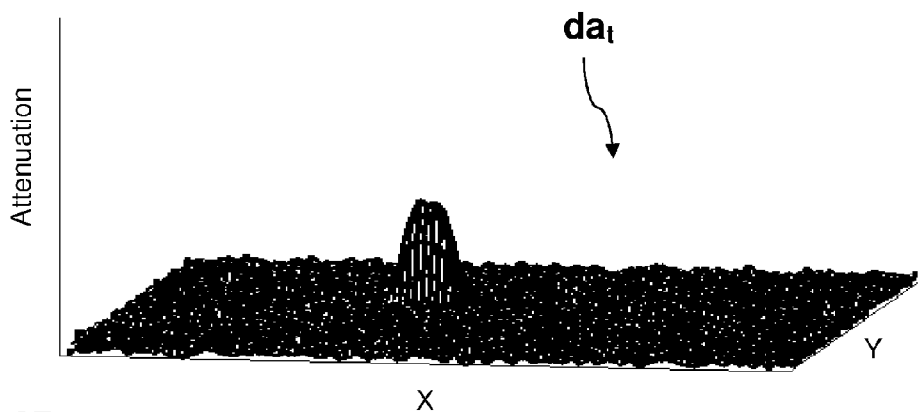
Figure 6C:
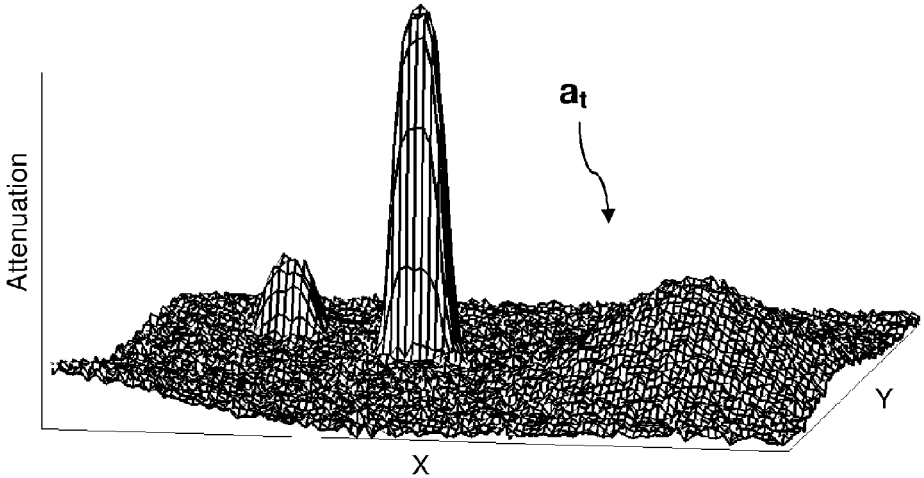
Figure 6D:
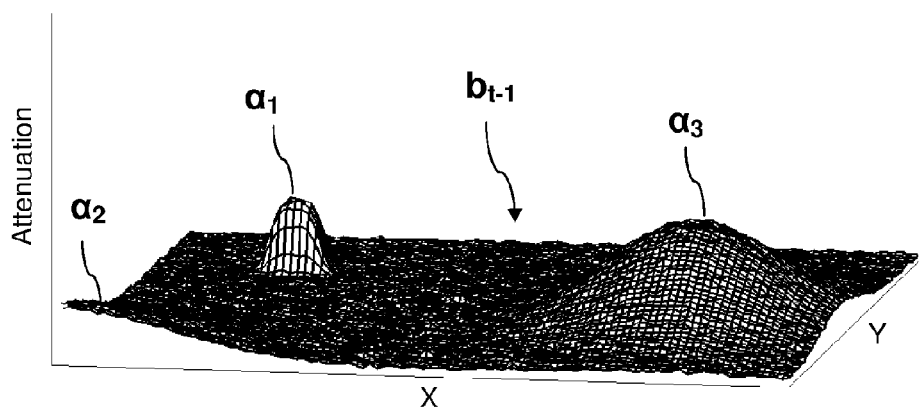
Figure 6E:
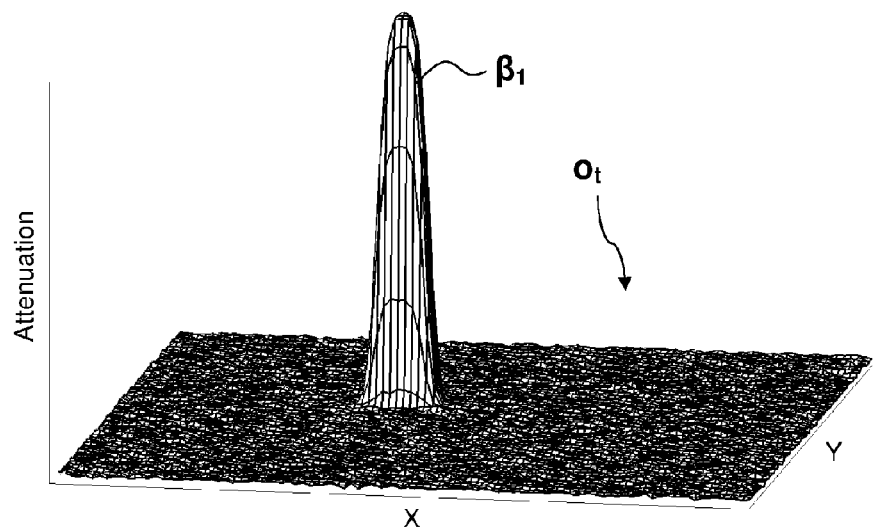

FIGS. 6A-6E illustrate different attenuation patterns used and generated in one iteration of the method according to the first embodiment. The patterns are shown as 3D plots in the coordinate system X,Y of the touch surface (cf. FIG. 2B). FIG. 6A is a plot of a total attenuation pattern $a_{t-n}$ determined in a previous iteration. The pattern $a_{t-n}$ represents the accumulated attenuation on the touch surface, both from touches and contaminations. FIG. 6B is a plot of the difference pattern $da_t$ reconstructed in the current sensing instance. The current pattern $da_t$ represents the added attenuation since the previous iteration, both from touches and contaminations. FIG. 6C is a plot of the total attenuation pattern $a_t$ obtained as a sum of the patterns $a_{t-n}$ and $da_t$ in FIGS. 6A and 6B. FIG. 6D is a plot of the background pattern $b_{t-1}$ estimated in the immediately preceding iteration. The pattern $b_{t-1}$ exhibits a first attenuation component α1 caused by a fingerprint from an earlier touch, a second attenuation component α2 caused by smear from a palm resting on the touch surface, and a third attenuation component α3 caused by a liquid spill. FIG. 6E is a plot of the current offset pattern $o_t$ obtained by subtracting the pattern $b_{t-1}$ in FIG. 6D from the pattern $a_t$ in FIG. 6C. An attenuation component β1 originating from a touch is seen against a uniform background level close to zero attenuation.

Figure 4:
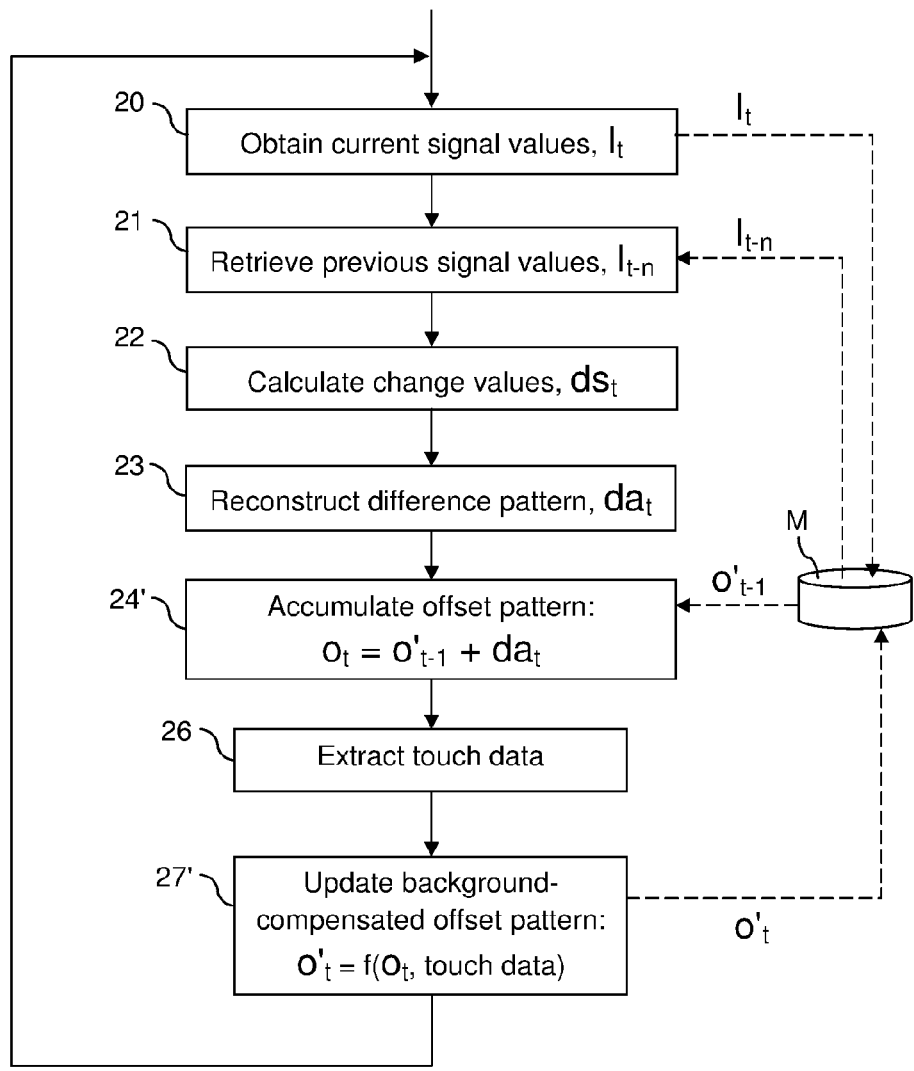
FIG. 4 is a flow chart of a touch determination method according to a second embodiment.

FIG. 4 shows a second embodiment of a method for reconstruction and touch data extraction. The second embodiment differs from the first embodiment in the definition of the tracking pattern and in the way that the influence of contaminations is handled. The following description will focus on these differences, and it may be assumed that steps 20-23 and 26 are identical between the first and second embodiments.

The second embodiment is based on the insight that it may be advantageous to avoid generating the offset pattern by subtracting a background pattern from the total attenuation pattern (step 25 in FIG. 3). As contaminations are accumulated on the touch surface, the total attenuation pattern $a_t$ as well as the background pattern $b_{t-1}$ may contain large attenuation values, at least locally. It is thus possible that significant inaccuracies are introduced in the offset pattern $o_t$ even by small errors if large attenuation values are subtracted from each other. Furthermore, detection of small differences between large attenuation values may necessitate undesirably high bit resolution in both the total attenuation pattern $a_t$ and the background pattern $b_{t-1}$.

In the second embodiment, the tracking pattern is formed by a background-compensated version of the offset pattern. As will be shown below, this may obviate the need to calculate or track the total attenuation pattern, as well as the need to update and track the background pattern. This may not only make the method more robust to accumulation of contamination on the touch surface and lower the required bit resolution, but may also improve the speed and/or lower the memory requirement of the method since less data needs to be retrieved and stored in memory.

Although the following motivation is given for background compensation using the above-described exponential forget algorithm, the skilled person understands that other background algorithms may be implemented in similar fashion. Consider the generation of the offset pattern according to step 25 of the first embodiment: $o_t = a_t - b_{t-1}$. This may be rewritten as:

$$o_t = \underbrace{a_{t-1} + da_t}_{a_t} - \underbrace{b_{t-2} - \varepsilon \cdot (a_{t-1} - b_{t-2})}_{b_{t-1}},$$

which after regrouping yields:

$$o_t = \underbrace{a_{t-1} - b_{t-2}}_{o_{t-1}} - \varepsilon \cdot (\underbrace{a_{t-1} - b_{t-2}}) + da_t = (1 - \varepsilon) \cdot o_{t-1} + da_t = o'_{t-1} + da_t,$$

where the tracking pattern $o'_{t-1}$ is a compensated or corrected offset pattern which is generated in a previous iteration so as to be compensated for the influence of contaminations on the touch surface. This means that, by suitable modification of the tracking step 24, it is possible to omit the need to explicitly estimate and track the background pattern (step 27) and thereby also the need to subtract the background pattern (step 25).

The second embodiment, as exemplified in FIG. 4, contains such a modified tracking step 24', and an estimation step 27' that corresponds to a combination of the compensation and background estimation steps 25, 27 of the first embodiment. All other steps 20-23 and 26 may be the same as in the first embodiment and will not be described further.

In the tracking step 24', the tracking pattern that is retrieved from memory M is a compensated offset pattern $o'_{t-1}$, which was generated in step 27' of the previous iteration. Like in step

24 of the first embodiment, the tracking pattern is updated by adding the difference pattern $da_t$ to the previous tracking pattern $o'_{t-1}$, pixel by pixel:

$$o_t = da_t + o'_{t-1}$$

This results in a current tracking pattern $o_t$, which is an offset pattern compensated for contaminations, except for contaminations added since the previous iteration. It is realized that this offset pattern $o_t$ is equivalent to the offset pattern generated by step 25 in the first embodiment. Similar to step 24, the accumulation in step 24' may utilize a starting pattern $o_0$ that may be set to represent total absence of interaction across the touch surface, e.g. zero attenuation. It is also conceivable to use other functions for combining the tracking pattern $o_{t-1}$ and difference pattern $da_t$, e.g. a weighted sum.

The current offset pattern $o_t$ from step 24 is then processed for extraction of touch data in the extraction step 26.

The estimation step 27' is designed to correct the current offset pattern $o_t$ from step 24' for the influence of contaminations added to the touch surface since the last iteration, without the use of an updated background pattern. This correction may be done pixel-by-pixel on basis of attenuation values of spatially corresponding pixels in the current offset pattern $o_t$ (from step 24') and/or the previous compensated offset pattern $o'_{t-1}$ (from step 27' in the previous iteration) and/or information about touch interactions (from step 26). It is also possible that the estimation takes into account corresponding data from iterations further back in time. The correction may be done in analogy with any of the above-described techniques for estimating the background pattern. For example, an "exponential forget" algorithm may be implemented as:

$$o'_t = (1-\varepsilon) \cdot o_t \quad \begin{cases} \varepsilon = 0, & \text{if touch} \\ \varepsilon = 0.1, & \text{if no touch} \end{cases}$$

which will cause the offset pattern to gradually approach zero attenuation in regions without touch interaction, while other pixels/regions will have a value representative of the local touch interaction.

By comparing FIGS. 3 and 4, it is realized that the potential problems associated with the subtraction of a background pattern is overcome in the second embodiment, and also that the number of memory accesses may be reduced. To further reduce the number of operations, step 27' may be incorporated into step 24', such that the contamination correction is made as part of the tracking. In the example of FIG. 4, step 24' may be implemented as:

$$o'_t = (1-\varepsilon) \cdot o_{t-1} + da_t \quad \begin{cases} \varepsilon = 0, & \text{if touch} \\ \varepsilon = 0.1, & \text{if no touch} \end{cases}$$

whereby the generation of the corrected offset pattern ($o'_t$) is embedded within the calculations for generating the current offset pattern $o_t$ based on the previous offset pattern $o_{t-1}$.

Figure 5:
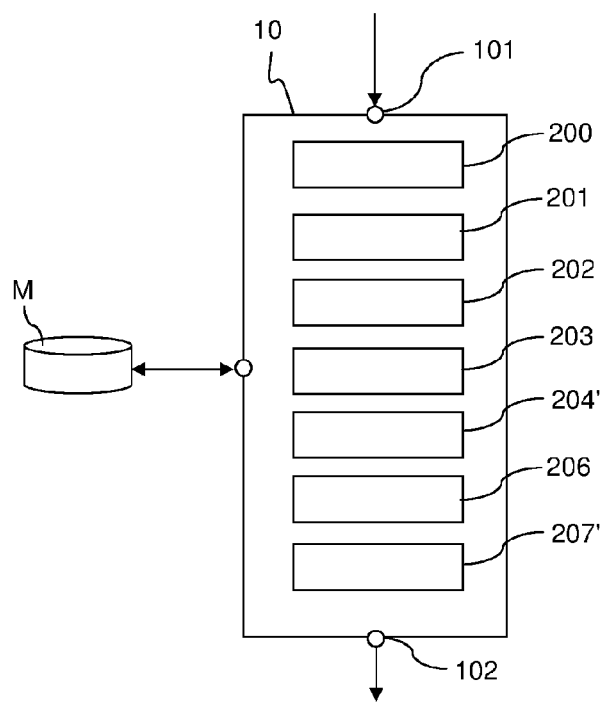
FIG. 5 is a block diagram of a device that implements the method of FIG. 4.

The methods according to first and second embodiments may be implemented by a data processing device (cf. signal processor 10 in FIGS. 1-2) which is connected to sample the measurement values from the light sensors 3 in the FTIR system. FIG. 5 shows an example of such a data processing device 10 for implementing the method in FIG. 4. In the illustrated example, the device 10 includes an input 101 for receiving the output signal. The device 10 further includes a data collection element (or means) 200 for sampling the current projection values, a retrieval element (or means) 201 for retrieving the previous projection values, a difference calculation element (or means) 202 for calculating the change values, a reconstruction element (or means) 203 for reconstructing the offset pattern, a tracking element (or means) 204' for accumulating the tracking pattern, an extraction element (or means) 206 for extracting touch data from the offset pattern, an estimation element (or means) 207' for correcting the offset pattern for added contaminations, and an output 102 for outputting the touch data. The data processing device in FIG. 5 may alternatively contain corresponding elements/means for implementing the method according to the first embodiment.

It is to be understood that the extraction step 26 may be executed separately from the other steps of the first and second embodiments, e.g. in a separate device which obtains the current offset pattern from memory M or directly from step 25 or 24'. In such a separated implementation, steps 27 and 27' may be given access to the touch data that is identified in step 26.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, and the adjustment factors, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

4. Concluding Remarks

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

It is to be understood that the interaction pattern may be subjected to post-processing before touch data extraction (cf. step 26 in FIGS. 3 and 4). Such post-processing may involve different types of filtering, for noise removal and/or image enhancement.

Furthermore, all the above embodiments, examples, variants and alternatives given with respect to an FTIR system may be equally applicable to a touch-sensitive apparatus that operates by transmission of other energy than light. In one example, the touch surface may be implemented as an electrically conductive panel, the emitters and sensors may be electrodes that couple electric currents into and out of the panel, and the output signal may be indicative of the resistance/impedance of the panel on the individual detection lines. In another example, the touch surface may include a material acting as a dielectric, the emitters and sensors may be electrodes, and the output signal may be indicative of the capacitance of the panel on the individual detection lines. In yet another example, the touch surface may include a material acting as a vibration conduc-ting medium, the emitters may be vibration generators (e.g. acoustic or piezoelectric transducers), and the sensors may be vibration sensors (e.g. acoustic or piezoelectric sensors).

In the detailed examples given hereinabove, the "previous iteration" has been synonymous with the immediately preceding iteration. This is not necessary. The previous iteration may be any number of iterations back in time from the current iteration, i.e. every n:th iteration. However, unless parallel processes are implemented to generate an offset pattern for each iteration, the offset pattern may only be available for touch data extraction every n:th iteration.

Figure 7:
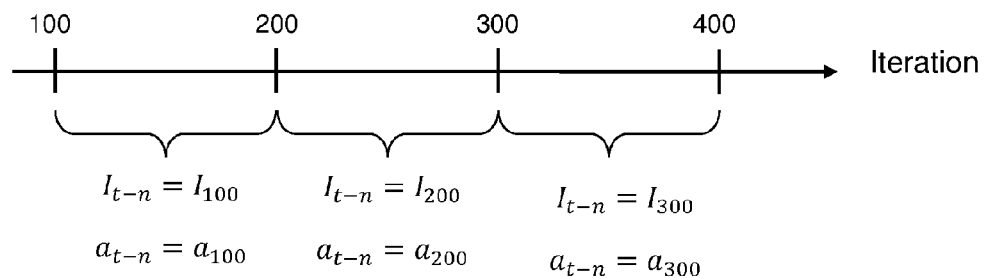
FIG. 7 illustrates an alternative selection of a previous iteration for use in calculating the difference pattern.

In an alternative, data from one and the same iteration is used in several subsequent iterations. For example, the change values may be calculated with respect to one and the same previous iteration for a number of consecutive iterations. Such an example is indicated in FIG. 7, in which the previous iteration is set to the current iteration every 100:th iteration, whereby the change values are calculated with respect to the same previous iteration and are accumulated to the total interaction pattern of this previous iteration for 100 consecutive iterations.

According to another inventive concept, the difference pattern $da_t$ is generated not by operating the reconstruction function on change values, but as a pixel-by-pixel difference between a reconstructed total attenuation pattern for a current iteration and a reconstructed total attenuation pattern for a previous iteration:

$$da_t = a_t - a_{t-1} = \mathcal{P}'(s_t) - \mathcal{P}'(s_{t-n}) = \mathcal{P}'\left(-\log\left(\frac{I_t}{REF}\right)\right) - \mathcal{P}'\left(-\log\left(\frac{I_{t-n}}{REF}\right)\right)$$

Such a variant may be unable to provide the specific advantages of using change values for the reconstruction, but may still be able to avoid the need for estimating and subtracting the background pattern by using the steps 24' and 27' as described in relation to the second embodiment. This inventive concept may be seen to include a processing method (and a corresponding computer program product, device and touch-sensitive apparatus), which implements, in each iteration of a sequence of iterations, the steps of determining a current total interaction pattern on a touch surface as a function of current projection values; retrieving a total interaction pattern determined in a preceding iteration in the sequence of iterations; generating a differential interaction pattern as a function of the current total interaction pattern and the total interaction pattern determined in the preceding iteration; generating a current accumulated touch interaction pattern as a function of the differential interaction pattern and a tracking pattern updated in the preceding iteration; updating the tracking pattern to represent the current accumulated touch interaction pattern; and providing the current accumulated touch interaction pattern for identification of touches on the surface portion.

The invention claimed is:

1. A method of enabling touch determination based on an output signal from a touch-sensitive apparatus, the touch-sensitive apparatus comprising a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal which represents a time-sequence of signal values for the detection lines, wherein the method comprises the steps of in each iteration of a sequence of iterations:

obtaining, based on the output signal, a current signal value for each detection line;

retrieving a current reference value for each detection line, the current reference value being representative of the current signal value obtained in a preceding iteration in the sequence of iterations;

calculating a change value for each detection line as a function of the current signal value and the current reference value;

operating a reconstruction algorithm on the change values to determine a differential interaction pattern on the surface portion;

updating a tracking pattern as a function of the differential interaction pattern;

generating a current accumulated touch interaction pattern as a function of the tracking pattern; and providing the current accumulated touch interaction pattern for identification of touches on the surface portion.

2. The method of claim 1, wherein the current accumulated touch interaction pattern represents a current distribution of total interaction on the surface portion compensated at least partly for an influence of contaminations present on the surface portion.

3. The method of claim 1, wherein said updating the tracking pattern comprises adding the differential interaction pattern to the tracking pattern updated in the preceding iteration.

4. The method of claim 1, wherein the tracking pattern represents a distribution of total interaction on the surface portion, and wherein the current accumulated touch interaction pattern is generated as a function of the updated tracking pattern.

5. The method of claim 4, wherein said generating the current accumulated touch interaction pattern further comprises: retrieving a background pattern which at least partly represents a distribution of interaction caused by contaminations present on the surface portion, and compensating the updated tracking pattern as a function of the background pattern.

6. The method of claim 5, wherein said compensating comprises subtracting the background pattern from the updated tracking pattern.

7. The method of claim 5, further comprising: updating the background pattern as a function of the touches identified on the surface portion in the current iteration.

8. The method of claim 7, wherein said updating the background pattern comprises: estimating an influence of added contaminations to the surface portion and including the estimated influence in the background pattern.

9. The method of claim 1, wherein the tracking pattern is updated to represent the current accumulated touch interaction pattern.

10. The method of claim 9, wherein said updating the tracking pattern comprises updating the current accumulated touch interaction pattern as a function of touches identified on the surface portion in the current iteration.

11. The method of claim 10, wherein said updating the tracking pattern comprises estimating an influence of added contaminations to the surface portion and removing the estimated influence from the current accumulated touch interaction pattern.

12. The method of claim 9, wherein the current accumulated touch interaction pattern is generated as a sum of the differential interaction pattern and the tracking pattern updated in the preceding iteration.

13. The method of claim 1, wherein each change value is calculated to represent the relative change between the current signal value and the preceding signal value for the detection line.

14. The method of claim 13, wherein the change value is calculated to represent a logarithm of the relative change.

15. The method of claim 1, wherein the preceding iteration precedes the current iteration by a fixed number of iterations.

16. The method of claim 1, wherein the differential interaction pattern, the tracking pattern and the accumulated touch interaction pattern comprise distributions of attenuation or transmission values across the surface portion.

17. A non-transitory computer program product comprising computer code which, when executed on a data-processing system, is adapted to carry out the method of claim 1.

18. A device for enabling touch determination based on an output signal from a touch-sensitive apparatus, the touch-sensitive apparatus comprising a panel configured to conduct signals from a plurality of incoupling points to a plurality of outcoupling points, thereby defining detection lines that extend across a surface portion or the panel between pairs of incoupling and outcoupling points, signal generating means coupled to the incoupling points to generate the signals, and signal detecting means coupled to the outcoupling points to generate the output signal which represents a time-sequence of signal values for the detection lines, said device comprising:

an input for receiving the output signal, and
a signal processor configred to, repeatedly in a sequence of iterations:

obtain, based on the output signal, a current signal value for each detection line;
retrieve a current reference value for each detection line, the current reference value being representative of the current signal value obtained in a preceding iteration in the sequence of iterations;
calculate a change value for each detection line as a function of the current signal value and the current reference value;
operate a reconstruction algorithm on the change values to determine a differential interaction pattern on the surface portion;
update a tracking pattern as a function of the differential interaction pattern;
generate a current accumulated touch interaction pattern as a function of the tracking pattern; and
provide the current accumulated touch interaction pattern for identification of touches on the surface portion.

19. A touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; means for generating the signals at the incoupling points: means for generating an output signal based on detected signals at the outcoupling points; and the device for enabling touch determination according to claim 18.

20. A touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; at least one signal generator coupled to the incoupling points to generate the signals; at least one signal detector coupled to the outcoupling points to generate an output signal which represents a time-sequence of signal values for the detection lines; and a signal processor connected to receive the output signal and configured to, repeatedly in a sequence of iterations:

obtain, based on the output signal, a current signal value for each detection line;
retrieve a current reference value for each detection line, the current reference value being representative of the current signal value obtained in a preceding iteration in the sequence of iterations;
calculate a change value for each detection line as a function of the current signal value and the reference value;
operate a reconstruction algorithm on the change values to determine a differential interaction pattern on the surface portion;
update a tracking pattern as a function of the differential interaction pattern;
generate a current accumulated touch interaction pattern as a function of the tracking pattern; and
provide the current accumulated touch interaction pattern for identification of touches on the surface portion.

* * * * *